US012116475B2

(12) United States Patent
Burmaster et al.

(10) Patent No.: US 12,116,475 B2
(45) Date of Patent: *Oct. 15, 2024

(54) CLEAR POLYPROPYLENE COMPOSITION FOR THERMOFORMING

(71) Applicant: FINA TECHNOLOGY, INC., Houston, TX (US)

(72) Inventors: Douglas Burmaster, Houston, TX (US); Joachin Azzi, Houston, TX (US); Russell McDonald, Humble, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,697

(22) Filed: Nov. 21, 2023

(65) Prior Publication Data
US 2024/0093015 A1 Mar. 21, 2024

Related U.S. Application Data

(63) Continuation of application No. 17/363,127, filed on Jun. 30, 2021, now Pat. No. 11,859,072.

(Continued)

(51) Int. Cl.
*C08L 23/16* (2006.01)
*B29C 48/00* (2019.01)
(Continued)

(52) U.S. Cl.
CPC ............ *C08L 23/16* (2013.01); *B29C 48/022* (2019.02); *C08K 5/098* (2013.01); *C08K 5/105* (2013.01);
(Continued)

(58) Field of Classification Search
CPC ....... C08L 23/142; C08L 23/16; C08K 5/098; C08K 5/20; C08K 5/527; C08K 5/227
See application file for complete search history.

(56) References Cited

U.S. PATENT DOCUMENTS 11,859,072 B2 * 1/2024 Burmaster ............. C08K 5/134
2005/0197456 A1 9/2005 Nicolini et al.
(Continued)

FOREIGN PATENT DOCUMENTS

WO WO 2011/090101 7/2011

OTHER PUBLICATIONS

Schmidt et al. Crystal Growth & Design 2012, 12, 2543â2551 (Year: 2012).*
International Search Report and Written Opinion in PCT/US2021/039749 dated Oct. 7, 2021 in 12 pages.
(Continued)

*Primary Examiner* — Mark S Kaucher
(74) *Attorney, Agent, or Firm* — NORTON ROSE FULBRIGHT US LLP (57) ABSTRACT

Disclosed is a polymeric composition that can include at least 95 wt. % of a polypropylene copolymer, and 50 ppm to 2000 ppm of an aryl amide containing clarifying agent, a phosphate ester salt containing clarifying agent, or a combination thereof. The polymeric composition can have a haze value of A after being extruded once and a haze value of B after being extruded 2 times, wherein the ratio of A to B is 1 to 1.35, wherein A is less than 25%, and wherein A and B are determined in accordance with ASTM D1003, at a thickness of about 40 mil.

22 Claims, 1 Drawing Sheet

Related U.S. Application Data (60) Provisional application No. 63/046,491, filed on Jun. 30, 2020.

(51) Int. Cl.
*C08K 5/098* (2006.01)
*C08K 5/105* (2006.01)
*C08K 5/134* (2006.01)
*C08K 5/20* (2006.01)
*C08K 5/52* (2006.01)

(52) U.S. Cl.
CPC ................ *C08K 5/134* (2013.01); *C08K 5/20* (2013.01); *C08K 5/52* (2013.01); *C08L 2201/10* (2013.01); *C08L 2203/16* (2013.01); *C08L 2203/30* (2013.01)

(56) References Cited

U.S. PATENT DOCUMENTS

| | | |
|---|---|---|
| 2012/0190797 A1 | 7/2012 | Kristiansen et al. |
| 2013/0165563 A1 | 6/2013 | Lopez et al. |
| 2014/0353550 A1* | 12/2014 | Hurenkamp ............ C08L 23/10 252/189 |
| 2017/0066904 A1 | 3/2017 | Uekita |

OTHER PUBLICATIONS

Maier, et al. "Processability and end-use properties of polypropylene clarified by a high efficiency clarifier", Annual Technician Conference: Plastics Encounter at Antee 2007, May 6-11, 2007 Cincinnati, Ohio, vol. 5, pp. 2663-2667, May 6, 2007.

Tolinski, Michael "Additives for Polyolefins. Getting the most out of the Polypropylene, Polyethylene and TPO. Chapter 10, Nucleation and Clarity", Elsevier, pp. 117-125, Jan. 1, 2015.

\* cited by examiner

CLEAR POLYPROPYLENE COMPOSITION FOR THERMOFORMING

CROSS REFERENCE TO RELATED APPLICATIONS

This application is a continuation of U.S. patent application Ser. No. 17/363,127 filed Jun. 30, 2021, which claims the benefit of U.S. Provisional Application 63/046,491 filed Jun. 30, 2020. Each application is incorporated herein by reference in its entirety.

BACKGROUND OF THE INVENTION

A. Field of the Invention

The invention generally concerns polypropylene containing polymeric compositions that can retain clarity after being subjected to multiple rounds of extrusion.

B. Description of Related Art

Polypropylene has use in multiple industries. For example, polypropylene containing compositions are used in packaging for consumer products, plastic parts for various industries including electrical, equipment manufacturing and automotive industry, household appliances, special devices like living hinges, and textiles. In some applications such as food storage containers, cups, lids, etc., good clarity of the resulting article of manufacture made from the polypropylene is desired.

One of the problems associated with making articles of manufacture from polypropylene-based compositions can be waste and/or loss of clarity. For example, a typical process for making such articles of manufacture includes thermoforming an extruded polypropylene sheet within a tool to form a thermoformed article. Typically, after the thermoforming process a portion(s) of the extruded sheet is that removed from tool is sold, whereas other portions, non-removed portions can be recycled and extruded again to form additional extruded sheets so as to avoid waste. Unfortunately, however, the recycled portions typically lose clarity due to the extrusion process, which typically introduces energy in the form of heat and/or pressure. This energy can result in reduced clarity of the recycled portions when compared with the clarity of the originally produced extruded sheet. One way to address this loss of clarity is to not use recycled materials, especially in instances where high clarity is desired for the article being made. Stated plainly, the loss of clarity from multiple extrusion passes can result in waste, which can increase production costs. U.S. Pat. No. 10,414,086 provides a discussion of how multiple extrusion passes for a given polymer resin can affect the properties of the resin.

SUMMARY OF THE INVENTION

A discovery has been made that provides a solution to at least some of the aforementioned problems. In one aspect, the solution can include providing a composition having a polypropylene copolymer in combination with particular amounts of an aryl amide containing clarifying agent and/or a phosphate ester salt containing clarifying agent. It has been discovered that this combination can provide for polypropylene-based compositions having relatively low initial haze and minimal to no increase in haze after multiple extrusion passes. Therefore, the compositions of the present invention can be recycled without jeopardizing the haze value of the resulting thermoformed article of manufacture made with the recycled material. By comparison, when polypropylene copolymer is combined with other clarifying agents (e.g., a sorbitol containing clarifying agent), a substantial increase in haze after multiple extrusion passes can occur. As illustrated in a non-limiting manner in the examples of this application, polymeric compositions of the present invention containing at least 95 wt. % of a polypropylene copolymer and 50 ppm to 2000 ppm of an aryl amide containing clarifying agent and/or a phosphate ester salt containing clarifying agent can have a haze value of A after being extruded once and a haze value of B after being extruded 5 times, wherein the ratio of A to B is 1 to 1.35. The haze values for A and B can be determined by ASTM D1003 (by HazeGard) at a thickness of about 40 mil. An advantage of the present invention is that portions of materials removed from an extruded polypropylene sheet that is thermoformed into an article of manufacture can be recycled and extruded again to form another extruded sheet or film with minimal to no loss of clarity of the extruded sheet having the recycled material. That is, the polymer compositions can be safely recycled without jeopardizing clarity, which can help increase the cost efficiencies of the production process.

One aspect of the present invention is directed to a polymeric composition. The polymeric composition can contain at least 95 wt. % of a polypropylene copolymer and 50 ppm to 2000 ppm of an aryl amide containing clarifying agent or a phosphate ester salt containing clarifying agent or a combination thereof. The polymeric composition can have a haze value of A after being extruded once and a haze value of B after being extruded 5 times, wherein the ratio of A to B can be 1 to 1.35. In some aspects, A can be less than 20%, 19%, 18%, 17%, 16%, 15%, 14%, 13%, 12%, 11%, 10%, 9%, 8%, 7%, 6%, 5%, 4%, 3%, 2%, 1%, 0.5%, or less. A and B can be determined in molded samples containing the polymeric composition at a thickness 40 mil in accordance with ASTM D1003, In some aspects, the ratio of A to B can be 1 to 1.32. In some aspects, the ratio of A to B can be 1 to 1.1. In some aspects A can be less than 15%. In some particular aspects, the ratio of A to B can be 1.03 to 1.07, and A can be less than 14%. In some particular aspects, the polymeric compositions can include 50 ppm to 400 ppm of the aryl amide containing clarifying agent. In some particular aspects, the aryl amide containing clarifying agent can be (1,3,5-tris(2,2-dimethyl propanamido)benzene. In some particular aspects, the polymeric compositions can include 500 ppm to 1500 ppm of the phosphate ester salt containing clarifying agent. In some particular aspects, the phosphate ester salt containing clarifying agent can be 2,2'-methylenebis (4,6,-di-tertbutylphenyl) phosphate sodium and/or lithium salt. In some aspects, the polymeric composition can include 96 wt. % to 99.9 wt. %, or 97 wt. % to 99.9 wt. %, or 98 wt. % to 99.9 wt. %, or 99 wt. % to 99.9 wt. %, of the polypropylene copolymer. In some aspects, the polypropylene copolymer can be propylene-ethylene random copolymer. In some particular aspects, the polypropylene copolymer can be an isotactic propylene-ethylene random copolymer. In some aspects, the propylene-ethylene random copolymer, can include 0.1 wt. % to 5 wt. %, or 0.1 wt. % to 3 wt. %, or 0.1 wt. % to 2 wt. % of ethylene units and 95 wt. % to 99.9 wt. %, or 97 wt. % to 99.9 wt. %, or 98 wt. % to 99.9 wt. % of propylene units, based on the total weight of the copolymer. In some aspects, the polypropylene copolymer, such as the propylene-ethylene random copolymer, such as the isotactic propylene-ethylene random copolymer can have a) a xylene soluble content of less than 8 wt. % such as 1 wt. % to 4 wt. %. b) a melt flow rate (MF) of 0.1 g/10 min to 150 g/10 min, or 1 to 60 g/10 min or 1 to 30 g/10 min or 1 to 10 g/10 min or 1 to 7 g/10 min, at 230° C., 2.16 kg measured in accordance with ASTM D-1238, c) 0.90 g/cc to 0.93 g/cc or 0.90 g/cc to 0.92 g/cc or 0.90 g/cc to 0.91 g/cc as measured in accordance with ASTM D792 or d) a polydispersity (Mw/Mn) of 3 to 15, or a combination thereof.

In some particular aspects, the polymeric composition can contain 99 wt. % to 99.9 wt. % of the propylene-ethylene random copolymer and 500 ppm to 1500 ppm of the phosphate ester salt containing clarifying agent, such as 2,2'-methylenebis (4,6,-di-tertbutylphenyl) phosphate sodium or lithium salt, where the ratio of A to B can be 1 to 1.32 and A can be less than 20%. In some particular aspects, the polymeric composition can contain 99 wt. % to 99.9 wt. % of the propylene-ethylene random copolymer and 50 ppm to 400 ppm of the aryl amide containing clarifying agent, such as (1,3,5-tris(2,2-dimethyl propanamido)benzene, where the ratio of A to B can be 1.03 to 1.07 and A can be less than 14%. In some aspects, the polymeric composition, can further contain one or more additives selected from antioxidants, stabilizers, neutralizers, and antistatics. In some aspects, the antioxidant can be a sterically hindered phenol. In some particular aspects, the antioxidant can be pentaerythritol tetrakis[3-[3,5-di-tert-butyl-4-hydroxyphenyl]propionate. In some particular aspects, the polymeric composition can contain 50 ppm to 500 ppm of the antioxidant, e.g. a sterically hindered phenol, such as pentaerythritol tetrakis[3-[3,5-di-tert-butyl-4-hydroxyphenyl]propionate. In some aspects, the stabilizer can be a phosphite containing stabilizer. In some particular aspects, the stabilizer can be tris(2,4-di-tert.-butylphenyl)phosphite. In some particular aspects, the polymeric composition can contain 200 ppm to 2000 ppm of the stabilizer e.g. phosphite containing stabilizer such as tris(2,4-di-tert.-butylphenyl) phosphite. In some aspects, the antistatic can be an ester containing antistatic. In some particular aspects, the antistatic can be glycerol monostearate. In some particular aspects, the antistatic can be glycerol monostearate with monoester content of 45 to 90 wt. %. In some aspects, the polymeric composition can contain 200 ppm to 2000 ppm of the antistatic e.g. ester containing antistatic, such as glycerol monostearate. In some aspects, the neutralizer can contain a stearate. In some particular aspects, the neutralizer can be calcium stearate, and/or zinc stearate. In some particular aspects, the polymeric composition can contain 100 ppm to 1000 ppm of the neutralizer e.g. a stearate such as calcium stearate, and/or zinc stearate. In some aspects, the polymeric composition can have a melt flow rate (MFR) of 0.1 g/10 min to 150 g/10 min, or 1 to 60 g/10 min or 1 to 30 g/10 min or 1 to 20 g/10 min or 1 to 10 g/10 min at 230° C., 2.16 kg measured in accordance with ASTM D-1238. In some aspects, an injection molded plaque comprising the polymeric composition has a yellowness index (YI) of −2.7 to −2, as measured in accordance with ASTM D-6290 at a thickness of 0.5 in or higher. In some aspects, the polymeric composition can be an extruded, a blow-molded, an injection-molded and/or a thermoformed composition. In some aspects, the polymeric composition can be an extruded sheet or film. In some aspects, the composition can be comprised in an article of manufacture. In some aspects, the article of manufacture can be transparent. In some aspects, the article of manufacture can be a thermoformed article. In some aspects, the article of manufacture can be a housewares food storage container, cooking utensil, plate, cup, cavity tray, drinking cup, measuring cup, strainer, turkey baster, non-food storage container, filing cabinet, cabinet drawer, general storage device, organizer, tote, sweater box, rigid packaging, deli container, deli container lid, dairy container, dairy container lid, personal care product bottle and jar, furniture, furniture component, building material and building container components, film, coating, fiber, bag, adhesive, yarn and fabric blister, or clamshell.

Another aspect is directed to a method for making a thermoformed article. The method can include (1) melt extruding a polymeric composition of the present invention to form an initial article (e.g., extruded polymeric sheet or film), and (2) thermoforming at least a first portion of the initial article within a tool to form a thermoformed article. During thermoforming of the initial article, the initial article in semi-solid form can be subjected to stretching in one or more directions. After thermoforming, the thermoformed article, e.g. of desired shape, can be retrieved from the tool. The initial article can be an extruded sheet and/or film. The thermoforming of the extruded sheet creates one or more waste portions, e.g. not thermoformed portion and/or web portion, of the extruded sheet. In some aspects, the one or more waste portions can be grinded and/or recycled, and melt extruded to form an additional extruded sheet. In some aspects, the additional extruded sheet can have substantially same clarity and haze as of the extruded sheet without using additional additives or energy. In some aspects, the additional extruded sheet and the extruded sheet can have haze values within 10% or 5% of each other, when measured at same thickness and same condition. In some aspects, the additional extruded sheet contains the one or more waste portions and a non-recycled composition comprising any one of the polymeric compositions of the present invention.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions and systems of the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, alternatively within 5%, alternatively within 1%, and alternatively within 0.5%.

The terms "wt. %," "vol. %," or "mol. %" refer to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The terms "ppm" refer to parts per million by weight of a component, based on the total weight, that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification include any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" can include "and" or "or." To illustrate, A, B, and/or C can include: A alone, B alone, C alone, a combination of A and B, a combination of A and C, a combination of B and C, or a combination of A, B, and C.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process and systems of the present invention can "comprise," "consist essentially of," or "consist of" particular ingredients, components, compositions, steps, etc. disclosed throughout the specification. With respect to the transitional phrase "consisting essentially of," in one non-limiting aspect, a basic and novel characteristic of the composition, and processes of the present invention are polymeric composition that can limited to no increase in haze value after being subjected to multiple rounds of extrusion.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

DETAILED DESCRIPTION OF THE INVENTION

A discovery has been made that provides a solution to at least some of the aforementioned problems associated with polypropylene compositions used for thermoforming. In one aspect, the discovery can include a polymeric composition containing at least 95 wt. % of a polypropylene copolymer and 50 ppm to 2000 ppm of an aryl amide containing clarifying agent or a phosphate ester salt containing clarifying agent or a combination thereof. As illustrated in the non-limiting examples polypropylene containing polymeric compositions of the present invention have low haze values and show relatively less increase in haze even after multiple extrusion passes. This can increase the recyclability of the compositions of the present invention, which can help to reduce waste typically associated with thermoforming processes.

These and other non-limiting aspects of the present invention are discussed in further detail in the following sections.

A. Polymeric Composition

The polymeric composition of the present invention can contain, i) at least 95 wt. %, such as 95 wt. % to 99.9 wt. % or at least any one of, equal to any one of, or between any two of 95, 96, 97, 98, 99, 99.1, 99.2, 99.3, 99.4, 99.5, 99.6, 99.7, 99.8, and 99.9 wt. % of the polypropylene copolymer and ii) 50 ppm to 2000 ppm or at least any one of, equal to any one of, or between any two of 50, 100, 200, 300, 400, 500, 600, 800, 1000, 1200, 1400, 1600, 1800, and 2000 ppm of the aryl amide containing clarifying agent or phosphate ester salt containing clarifying agent or a combination thereof. In some aspects, the polymeric composition of the present invention can contain, at least 95 wt. %, such as 95 wt. % to 99.9 wt. %, or 96 wt. % to 99.9 wt. %, or 97 wt. % to 99.9 wt. %, or 98 wt. % to 99.9 wt. %, or 99 wt. % to 99.9 wt. %, of the polypropylene copolymer and 50 ppm to 400 ppm or 100 ppm to 300 ppm of the aryl amide containing clarifying agent. In some aspects, the polymeric composition of the present invention can contain, at least 95 wt. %, such as 95 wt. % to 99.9 wt. %, or 96 wt. % to 99.9 wt. %, or 97 wt. % to 99.9 wt. %, or 98 wt. % to 99.9 wt. %, or 99 wt. % to 99.9 wt. %, of the polypropylene copolymer and 500 ppm to 1500 ppm or 800 ppm to 1200 ppm of the phosphate ester salt containing clarifying agent.

The polymeric composition can have a haze value of A after being extruded once and a haze value of B after being extruded 5 times, wherein the ratio of A to B can be 1 to 1.35 or at least any one of, equal to any one of, or between any two of 1, 1.03, 1.05, 1.07, 1.1, 1.15, 1.2, 1.25, 1.3, 1.32, 1.33 and 1.35 and A can be less than 25%, less than 20%, less than 15%, less than 14% such as 13%, or 15% or 13% to 20%. In some aspects, the polymeric composition can have a haze value of C after being extruded thrice, and the ratio of A to C can be 1 to 1.15 or 1 to 1.01. In some aspects, the ratio of C to B can be 1 to 1.15 or 1 to 1.01. The haze values can be determined in accordance with ASTM D1003 (by HazeGard) at a thickness of about 40 mil with molded plaques containing the polymeric composition. A, B and/or C can be determined with the extrusion pass parameters set at, and/or performed at conditions similar to (e.g. within ±5%) the respective conditions provided in Table 4 and 5.

1. Polypropylene Copolymer

The polypropylene copolymer can be propylene-ethylene random copolymer. In some particular aspects, the polypropylene copolymer can be an isotactic propylene-ethylene random copolymer. In some aspects, the propylene-ethylene random copolymer, such as the isotactic propylene-ethylene random copolymer can include 0.1 wt. % to 5 wt. %, or 0.1 wt. % to 3 wt. % or 0.1 wt. % to 2 wt. % or at least any one of, equal to any one of, or between any two of 0.1, 0.2, 0.4, 0.6, 0.8, 1, 2, 3, 4 and 5 wt. % of ethylene units and 95 wt. % to 99.9 wt. %, or 97 wt. % to 99.9 wt. %, or 98 wt. % to 99.9 wt. % or at least any one of, equal to any one of, or between any two of 95, 96, 97, 98, 99, 99.2, 99.4, 99.6, 99.8 and 99.9 wt. % of propylene units, based on the total weight of the copolymer. In some aspects, the polypropylene copolymer such as the propylene-ethylene random copolymer can have a xylene soluble content of less than 8 wt. % such as 1 wt. % to 4 wt. % or at least any one of, equal to any one of, or between any two of 1, 2, 3 and 4 wt. %. In some aspects, the polypropylene copolymer such as the propylene-ethylene random copolymer can have a polydispersity (Mw/Mn) of 3 to 15 or at least any one of, equal to any one of, or between any two of 3, 4, 5, 6, 7, 8, 9, 10, 11, 12, 13, 14 and 15, wherein the polydispersity is measured using gel permeation chromatography (GPC). In some aspects, the polypropylene copolymer such as the propylene-ethylene random copolymer can have a melt flow rate (MFR) of 0.1 g/10 min to 150 g/10 min, or 1 to 60 g/10 min, or 1 to about 30 g/10 min, or 1 to about 10 g/10 min, or 1 to about 7 g/10 min, or at least any one of, equal to any one of, or between any two of 0.1, 1, 2, 3, 4, 5, 6, 7, 8, 9, 10, 20, 30, 40, 50, 60, 70, 80, 90, 100, 110, 120, 130, 140, 150 and 160 g/10 min at 230° C., 2.16 kg measured in accordance with ASTM D-1238. In some aspects, the polypropylene copolymer such as the propylene-ethylene random copolymer can have a density of 0.90 g/cc to 0.93 g/cc or 0.90 g/cc to 0.92 g/cc or 0.90 g/cc to 0.91 or at least any one of, equal to any one of, or between any two of 0.9, 0.902, 0.904, 0.906, 0.908, 0.91, 0.915, 0.92, 0.925 and 0.93 g/cc as measured in accordance with ASTM D792. In some aspects, the polypropylene copolymer such as the propylene-ethylene random copolymer can have a combination of, or all of the properties mentioned herein.

The polypropylene copolymer can be prepared via conventional polymerization processes such as those known in the art. Examples of such polymerization processes include slurry, liquid-bulk and gas-phase polymerizations. In slurry polymerization processes, polymerization occurs in the presence of a solvent, e.g. hexane, within a loop or continuous stirred tank reactor. Polymerization may also be carried out by bulk-phase polymerization, where liquid propylene and ethylene serve as both monomer and diluent. In a typical bulk process, one or more loop reactors are generally employed. In other aspects, the copolymer may be produced by gas phase polymerization of propylene and ethylene, which is typically carried out in a fluidized bed reactor. Polymer fluff or powder produced from the polymerization reaction can be removed from the reactor and can then be processed via conventional techniques, such as by extrusion, to produce the desired copolymer pellets. The amount of ethylene monomer used during polymerization of the copolymer is desirably in proportion to the desired final ethylene content of the target propylene copolymer. In some embodiments the ethylene content during polymerization can range from 0.1 to 5 wt. %, or 0.1 to about 3 wt. % or 0.1 to about 2 wt. %, based on the total weight of the monomers, e.g. ethylene and propylene, present during polymerization. In some aspects, the polypropylene copolymer, such as propylene-ethylene random copolymer can be prepared using metallocene catalysts or Ziegler-Natta catalyst.

Ziegler-Natta catalysts, which are well known in the art, useful in the preparation of isotactic polypropylene can be derived from a halide of a transition metal, such as titanium, chromium or vanadium with a metal hydride and/or metal alkyl, typically an organoaluminum compound, as a co-catalyst. In some aspects, the catalyst is can contain a titanium halide supported on a magnesium compound. Ziegler-Natta catalysts, such as titanium tetrachloride (TiCl4) supported on an active magnesium dihalide, such as magnesium dichloride or magnesium dibromide, as disclosed, for example, in U.S. Pat. Nos. 4,298,718 and 4,544,717, both to Mayr et al., and which are herein incorporated by reference, are supported catalysts. Silica may also be used as a support. The supported catalyst may be employed in conjunction with a co-catalyst or electron donor such as an alkylaluminum compound, for example, triethylaluminum (TEAL), trimethyl aluminum (TMA) and triisobutyl aluminum (TIBAL).

2. Clarifying Agent

The polymeric composition of the present invention includes a phosphate ester salt containing clarifying agent and/or an aryl amide containing clarifying agent.

Non-limiting examples of phosphate ester salt containing clarifying agent include 2,2-methylene-bis(4,6-ditert-butylphenyl)phosphate, and/or aluminum hydroxybis(2,4,8,10-tetrakis(1,1-dimethyl) 6-hydroxy-12H-dibenzo[d,g][1,2,3][dioxaphosphocin 6-oxidato]. In some particular aspect the clarifying agent can be 2,2-methylene-bis(4,6-ditert-butylphenyl)phosphate. Examples of commercially available phosphate ester salts containing clarifying agents include, without limitation, ADK STABILIZER NA-71 and ADK STABILIZER NA-21, both available from Amfine Chemical Corp., Allendale, N.J.

Non-limiting examples of the aryl amide containing clarifying agent can be a 1,3,5-benzenetrisamide amide derivative. In some aspects, the aryl amide containing clarifying agent can be (1,3,5-tris(2,2-dimethyl propanamido)benzene. Examples of commercially available aryl amide containing clarifying agents include, without limitation, IRGACLEAR XT 386 available from BASF.

The polymeric compositions of the present invention can be free of, or essentially free of, such as contain less than 100 ppm, or less than 50 ppm or less than 10 ppm of clarifying agents containing sorbitol or sorbitol derivative, nonitol or nonitol derivative, and/or xylitol or xylitol derivative.

3. Additives

In some aspects, the polymeric composition, can further contain one or more additives selected from antioxidants, stabilizers, neutralizers, processing aids, peroxides, slip agents and/or antistatics.

In some aspects, the polymeric composition can contain iii) 50 ppm to 500 ppm or at least any one of, equal to any one of, or between any two of 50, 100, 200, 300, 400 and 500 ppm of an antioxidant, iv) 200 ppm to 2000 ppm or at least any one of, equal to any one of, or between any two of 200, 400, 600, 800, 1000, 1200, 1400, 1600, 1800 and 2000 ppm of a stabilizer v) 200 ppm to 2000 ppm or at least any one of, equal to any one of, or between any two of 200, 400, 600, 800, 1000, 1200, 1400, 1600, 1800 and 2000 ppm of a antistatic, or iv) 100 ppm to 1000 ppm or at least any one of, equal to any one of, or between any two of 100, 200, 400, 600, 800, and 1000 ppm of a neutralizer or any combination thereof.

The antioxidant can be a sterically hindered phenol and/or a phosphite containing antioxidant. A combination of antioxidants can be used. In some aspects, the sterically hindered phenol antioxidant can be pentaerythritol tetrakis[3-[3,5-di-tert-butyl-4-hydroxyphenyl]propionate, octadecyl-3-[3,5-di-tert-butyl-4-hydroxyphenyl]propionate], pentaerythritol tetrakis[3-[3,5-di-tert-butyl-4-hydroxyphenyl]propionate, or 1,3,5-tris(3,5-di-tert-butyl-4-hydroxybenzyl)-1,3,5-triazine-2,4,6(1H,3H,5H)-trione, or any combinations thereof. In some aspects, the phosphite containing antioxidant can be tris(2,4-di-tert.-butylphenyl)phosphite, bis (2,4-dicumylphenyl) pentaerythritol diphosphate, or bis (2,4-di-t-butylphenyl) pentaerythritol diphosphate or any combination thereof. In some particular aspects, the antioxidant can be pentaerythritol tetrakis[3-[3,5-di-tert-butyl- 4-hydroxyphenyl]propionate. The stabilizer can be a phosphite containing stabilizer and/or oligomeric hindered amine containing stabilizer. In some aspects, the phosphite containing stabilizer can be tris(2,4-di-tert.-butylphenyl)phosphite. In some aspects, the oligomeric hindered amine containing stabilizer can be butanedioic acid, dimethylester, polymer with 4-hydroxy-2,2,6,6-tetramethyl-1-piperidine ethanol. In some particular aspects, the stabilizer can be tris(2,4-di-tert.-butylphenyl)phosphite. In some aspects, the antistatic can be glycerol monostearate. The glycerol monostearate can have a monoester content of 45 to 90 wt. % or at least any one of, equal to any one of, or between any two of 45, 50, 55, 60, 65, 70, 75, 80, 85 and 90 wt. %. The neutralizer can be a stearate containing neutralizer, hydrotalcite, zinc oxide or sodium benzoate or any combinations thereof. The stearate containing neutralizer can be calcium stearate, and/or zinc stearate. In some particular aspects, the neutralizer can be a stearate containing neutralizer such as calcium stearate, and/or zinc stearate.

In some aspects, the polymeric composition can contain 50 ppm to 500 ppm of a sterically hindered phenol, such as pentaerythritol tetrakis[3-[3,5-di-tert-butyl-4-hydroxyphenyl]propionate, 200 ppm to 2000 ppm of a phosphite containing stabilizer such as tris(2,4-di-tert.-butylphenyl)phosphite, 200 ppm to 2000 ppm of an ester containing antistatic, such as glycerol monostearate, or 100 ppm to 1000 ppm of a stearate such as calcium stearate, and/or zinc stearate or any combinations thereof.

B. Properties of the Polymeric Compositions

In some aspects, the polymeric composition can have a melt flow rate (MFR) of 0.1 g/10 min to 150 g/10 min, or 1 to 60 g/10 min, or 1 to 30 g/10 min, or 1 to 20 g/10 min, or 1 to 10 g/10 min, or 1 to 7 g/10 min at 230° C., 2.16 kg measured in accordance with ASTM D-1238. In some aspects, the polymeric composition can have a flexural modulus of 100 Kpsi to 300 Kpsi at 4-8 N as determined by ASTM D790-97. In some aspects, the polymeric composition can have a notched Izod impact strength greater than 0.9 ft-lb/in, such as 1 ft-lb/in to 1.5 ft-lb/in at 23° C., as measured in accordance with D638. In some aspects, the polymeric composition can have a tensile modulus greater than 210 KPsi, such as 211 Kpsi to 300 Kpsi at 23° C., as measured in accordance with D 638. In some aspects, the polymeric composition can have an elongation at break greater than 180%, such as 200% to 250% at 23° C., as measured in accordance with D-638. In some aspects, the polymeric composition can have a crystallization temperature of from about 100° C. to 135° C. or 115° C. to 130° C. or 120° C. to 125° C., as determined by Differential Scanning calorimetry (DSC) in accordance with ASTM D-3418D.

In some aspects, prior to any extrusion of the polymeric composition in an extruder, the polymeric composition can exhibit a yellowness index (YI) of less than 1, or −5 to 0 or −3 to −1.5, or −2.7 to −2, as measured in accordance with ASTM D-6290. In certain embodiments, after 1, 2, 3, 4, or 5 extrusions of the polymeric composition through a slot or die of an extruder at a temperature of about 545° F., the YI may increase. For example and without limitation, after 1, 2, 3, 4, or 5 extrusions of the polymeric composition through a slot or die of an extruder at a temperature of about 545° F., the YI may range −2 to 2.5, or −1.8 to 2, as measured in accordance with ASTM D-6290. In some aspects, the polymeric composition can exhibit a "Color L" of 60 to 85, 70 to 80, 72 to 78, about 74, as measured in accordance with ASTM D-6290. In some aspects, the polymeric composition can exhibit a "Color a" of less than 1, less than 0, −2 to 0, −1 to 0, or −0.7 to −0.2, as measured in accordance with ASTM D-6290. In some aspects, the polymeric composition can exhibit a "Color b" of less than 1, less than 0, −2 to 0, −1 to 0, or −0.9 to −0.3 as measured in accordance with ASTM D-6290.

In some aspects, prior to any extrusion of the polymeric composition in an extruder, the polymeric composition can exhibit an initial % haze value (e.g., initial haze value being the haze value without being subjected to an extrusion pass) of less than 20%, less than 18%, less than 16%, or less than 15%, as measured in accordance with ASTM D1003, at a thickness of about 40 mm. In certain aspects, after 1, 2, 3, 4, or 5 extrusions of the polymeric composition through a slot or die of an extruder at a temperature of about 545° F., the % haze value as measured in accordance with ASTM D1003, at a thickness of about 40 mil, may change by no more than about 30%, 20%, 10%, 6%, 5%, 4%, 3%, 2%, 1%, 0.5%, or less, relative to the initial % haze value. In some aspects, the % change can be an increase in haze value. In some aspects, the % change can be a decrease in haze value.

In some aspects, the polymeric composition can have a combination of, or all of the properties mentioned herein.

C. Methods for Making the Polymeric Compositions and Methods of Thermoforming

The polymeric composition of the present invention can be made by various methods known in the art such as extrusion, injection molding, thermoforming or like. For example the components, such as the polypropylene copolymer, aryl amide containing clarifying agent, and/or phosphate ester salt containing clarifying agent, and one or more additives can be mixed such as dry blended and then melt-blended such as extruded to form the polymeric composition. The extruder used can be any type of extruder known in the art. The extrusion can be performed at a temperature high enough to melt the composition, but as low as possible to avoid excessive thermal degradation of the components. In certain aspects, the thermoplastic composition can be subjected to multiple, sequential passes through an extruder. Without being bound by theory, it is believed that subjecting a polymer resin to 1 or more passes through an extruder simulates accelerated aging of the polymer resin due to the elevated pressures and temperatures encountered by the polymer resin during extrusion. Also, without being bound by theory, it is believed that subjecting a polymer resin to passes through an extruder simulates reprocessing of regrind trim of the polymer in sheet extrusion thermoforming. In each pass, the thermoplastic composition may be extruded through a slot or die. The extruded material can be quenched if desired. For each extrusion, the final melt temperature prior to extrusion through a die can be independently 302 to about 600° F. (150-315° C.), with pressures independently ranging from about 100 to about 30,000 psi (0.7-207 mPa).

One aspect is directed to a method for forming a thermoformed article containing the polymeric composition. The method can include melt extruding the components, such as the polypropylene copolymer, aryl amide containing clarifying agent and/or phosphate ester salt containing clarifying agent, and one or more additives to form an initial article, and thermoforming the initial article to form a thermoformed article. The initial article can be an extruded sheet or film containing the polymeric composition. Thermoforming the initial article may include subjecting the initial article to heat, vacuum or pressure, or combinations thereof to convert the initial article into the thermoformed article. For example and without limitation, the initial article can be thermoformed by placing the initial article into a portiotool. The initial article within the too may be subjected to heat, vacuum or pressure, or combinations thereof, causing the initial article to conform to the shape of interior walls of the tool. In some aspects, the initial article may be heated prior to being placed in the tool. The heated initial article may then be placed into the tool, the tool may be closed onto the initial article, and a vacuum or pressure may then be applied to the tool. Application of the vacuum or pressure to the heated initial article within the tool causes the initial article to conform to the shape of the interior of the tool, thus forming the thermoformed article. The formed thermoformed article of desired shape can be removed from the tool. The non-removed portion of the initial article e.g. web of the sheet and/or, not thermoformed waste portion of the sheet can be grinded, reused and/or recycled to make a second initial article. The second initial article can be thermoformed to form another thermoformed article. The second initial article and the another thermoformed article can have haze values that are comparable to the initial article and the first thermoformed shape. Stated another way, the polymeric composition of the present invention and/or articles containing the polymeric composition have stable haze values even after being subjected to 2, 3, 4, 5, or more extrusion passes, which allows for articles containing the polymeric composition to be recycled with limited to no loss of clarity for the recycled portions or articles of manufacture made from at least a portion of the recycled portions.

In some aspects, the initial article can be formed by extrusion of the molten polymeric composition through a slot or die and cooling e.g. quenching the extrudate to form the initial article e.g., the extruded sheet. Extrusion of the molten polymeric composition can occur at a temperature ranging from 150° C. to 315° C. or at least any one of, equal to any one of, or between any two of 150° C., 160° C., 170° C., 180° C., 190° C., 200° C., 210° C., 220° C., 230° C., 240° C., 250° C., 260° C., 270° C., 280° C., 290° C., 300° C., 310° C., and 315° C. In some aspects, the extruded sheet can have a thickness of 0.5 to 100 mm, 12 to 20 mm, 12 to 16 mm, or 16 to 20 mm or at least any one of, equal to any one of, or between any two of 0.5, 1, 2, 4, 6, 8, 10, 12, 14, 16, 18, 20, 30, 40, 50, 60, 70, 80, 90 and 100 mm. In some aspects, the initial article can be a multilayer extruded sheet and each layer of the multilayer extruded sheet can independently have a thickness of 0.5 to 100 mm, 12 to 20 mm, 12 to 16 mm, or 16 to 20 mm or at least any one of, equal to any one of, or between any two of 0.5, 1, 2, 4, 6, 8, 10, 12, 14, 16, 18, 20, 30, 40, 50, 60, 70, 80, 90 and 100 mm. In some aspects, the initial article can be a cast sheet or an oriented sheet.

In some aspects, thermoforming the initial article subjects the initial article to solid-state stretching. In some aspects, the extruded sheet can be reheated and thermoformed within a tool. During the conforming of the extruded sheet to the shape of the interior of the tool, the extruded sheet may undergo solid-state stretching in one or more directions, thus forming a solid-state stretched, thermoformed article from the extruded sheet.

D. Articles Containing the Polymeric Compositions

The polymeric compositions of the present invention can be comprised in an article of manufacture. The article of manufacture can be an extruded, a blow-molded, an injection-molded, and/or thermoformed article. In some aspects, the article of manufacture can be transparent.

Non-limited examples of the article of the articles of manufacture include housewares, food storage containers, cooking utensils, plates, cups, measuring cups, drinking cups, strainers, turkey basters, non-food storage containers, filing cabinets and particularly clear drawers used in such cabinets, general storage devices, such as organizers, totes, sweater boxes, films, coatings and fibers, bags, adhesives, yarns, fabrics, bottles, jars, plates and cups, clamshell and the like. Article of manufacture can be rigid packaging, such as deli containers and lids including those used for dips, spreads, and pasta salads, dairy containers and lids including those used for storing cottage cheese, butter and yogurt, personal care products, and bottles and jars. In these and other uses the resins may be combined with other materials, such as particulate materials, including talc, calcium carbonate, wood, and fibers, such as glass or graphite fibers, to form composite materials. Examples of such composite materials include components for furniture, automotive components and building materials, particularly those used as lumber replacement.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

A. Example 1

Polymeric compositions C-1 to C-6, with compositions as shown in table 1 were made. Compositions C-1 to C-6 were injection molded into ASTM specification. Extrusion parameters used are provided in table 2. The optical and mechanical properties of the compositions are provided in table 3.

TABLE 1

| Components | Compositions | | | | | |
|---|---|---|---|---|---|---|
| | C-1 | C-2 | C-3 | C-4 | C-5 | C-6 |
| Propylene-ethylene random copolymer (wt. %) | 99.7 | 99.5 | 99.5 | 99.7 | 99.6 | |
| Propylene homo polymer (wt. %) | | | | | | 99.7 |
| Pentaerythritol tetrakis[3-[3,5-di-tert-butyl-4-hydroxyphenyl]propionate (ppm) | 250 | 250 | 250 | 250 | 250 | 250 |
| Tris(2,4-di-tert.-butylphenyl)phosphite (ppm) | 1000 | 1000 | 1000 | 1000 | 1000 | 1000 |
| Sodium Benzoate (ppm) | 800 | | | | | 800 |
| Glycerol mono stearate (ppm) | 800 | 800 | 800 | 800 | 800 | 800 |
| Calcium stearate (ppm) | | 500 | 500 | 500 | 500 | |
| Bis(3,4-dimethylbenzylidene) sorbitol (ppm) | | 1800 | | | | |
| NX8000 (ppm) | | | 2100 | | | |
| 1,3,5-tris(2,2-dimethyl propanamido)benzene (ppm) | | | | 200 | | |
| 2,2'-methylenebis (4,6,-di-tertbutylphenyl) phosphate (ppm) | | | | | 1000 | |

TABLE 2

| Extrusion parameters | | | | | | |
|---|---|---|---|---|---|---|
| Zone 1 | Zone 1 | Zone 1 | Zone 1 | Die 1 | Die 2 | Die 3 |
| 360° F. | 370° F. | 370° F. | 385° F. | 390° F. | 410° F. | 410° F. |

TABLE 3

Composition properties

| Properties | | C-1 | C-2 | C-3 | C-4 | C-5 | C-6 |
|---|---|---|---|---|---|---|---|
| Haze Plaques | 20 mil | 16.5 | 10.1 | 9.8 | 7.6 | 10.0 | 20.9 |
| | 40 mil | 33.1 | 21.3 | 21.9 | 15.0 | 19.0 | 30.6 |
| | 60 mil | 44.0 | 22.6 | 24.6 | 17.9 | 26.6 | 52.8 |
| | 80 mil | 62.4 | 40.7 | 42.4 | 31.6 | 36.7 | 69.2 |
| Haze Plaques after autoclave | 20 mil | 45.1 | 12.9 | 12 | 12.1 | 11.7 | 48.1 |
| | 40 mil | 65.2 | 28.6 | 27.2 | 24.7 | 21.9 | 73.8 |
| | 60 mil | 72.4 | 35.6 | 34.9 | 32.7 | 32.2 | 79.7 |
| | 80 mil | 79.3 | 53.5 | 50.9 | 44.8 | 43.9 | 84.4 |
| Color Pellets | L | 74.7 | 73.7 | 72.7 | 74 | 74.1 | 76.2 |
| | a | −0.55 | −0.58 | 2.72 | −0.52 | −0.54 | −0.52 |
| | b | −1.01 | −0.98 | −10.06 | −0.77 | −0.64 | −1.62 |
| | YI | −3.05 | −3.03 | −22.15 | −2.46 | −2.15 | −4.38 |
| Gloss | Gloss, 45 | 50.4 | 51.6 | 52.3 | 50 | 51.6 | 50.1 |
| Melt Flow Rate | | 4.1 | 4.6 | 4.1 | 3.9 | 4.2 | 4.4 |
| DSC | First Melt Peak (° C.) | 158.2 | 158.6 | 158.4 | 158.3 | 159.2 | 166.2 |
| | First Melt Delta H (J/g) | 87.81 | 80.54 | 84.8 | 90.59 | 84.42 | 93.09 |
| | Recrystallization Peak (° C.) | 125.2 | 125.4 | 125 | 121.1 | 124.1 | 129.6 |
| | Recrystallization Delta H (J/g) | 99.54 | 92.57 | 95.22 | 96.89 | 93.08 | 105.6 |
| | Second Melt Peak (° C.) | 158.4 | 159.8 | 159.2 | 158.5 | 159.6 | 166 |
| | Second Melt Delta H (J/g) | 102.6 | 93.89 | 98.55 | 100.4 | 96.98 | 112.8 |
| | Crystallinity (%) | 49.1 | 44.9 | 47.2 | 48 | 46.4 | 54 |
| HDT | Unannealed heat distortion (66 psi) (° F.) | 213 | 196 | 198 | 201 | 217 | 245 |
| Tensile Bars | Tensile Modulus (Psi) | 218825 | 22116 | 220358 | 219472 | 211280 | 261828 |
| | Tensile Strength at Yield (Psi) | 4973 | 5000 | 5039 | 5033 | 4889 | 5509 |
| | Tensile Strength at Break (%) | 3231 | 2717 | 3119 | 2789 | 2735 | 2120 |
| | Elongation at Yield (Psi) | 8.7 | 8.4 | 8.5 | 8.3 | 8.7 | 6.1 |
| | Elongation at Break (%) | 294 | 103 | 219 | 204 | 222 | 64.1 |
| Flex | Flexural Modulus (chord 4-8N) (KPsi) | 196 | 200 | 212 | 217 | 213 | 284 |
| Izod | Izod-Notched (ft-lb/in) | 1.9 | 0.8 | 0.9 | 1.0 | 1.1 | 0.8 |
| | Break type | Complete | Complete | Complete | Complete | Complete | Complete |
| Instrum. Impact 73° F. | Impact Energy (ft-lb) | 87.91 | 87.83 | 88.05 | 87.82 | 87.97 | 88.10 |
| | Maximum Load (lbf) | 186.06 | 179.61 | 174.73 | 187.15 | 176.93 | 151.95 |
| | Total Energy (ft-lb) | 4.51 | 3.08 | 2.37 | 2.42 | 2.85 | 2.60 |
| | Energy to Max Load (ft-lb) | 1.93 | 1.42 | 0.84 | 0.99 | 0.83 | 1.57 |
| | Impact Velocity (ft/sec) | 11.13 | 11.13 | 11.14 | 11.13 | 11.14 | 11.15 |
| | Energy after Max Load (ft-lb) | 2.58 | 1.66 | 1.53 | 1.43 | 2.02 | 1.03 |
| GPC | Mn (kDa) | 55016 | 53654 | 54378 | 53363 | 54393 | 54295 |
| | Mw (kDa) | 373893 | 35649 | 364416 | 353378 | 359849 | 361063 |
| | Mz (kDa) | 1655639 | 1451932 | 1518802 | 1456515 | 1464851 | 1572202 |
| | Polydispersity | 6.8 | 6.6 | 6.7 | 6.6 | 6.6 | 6.7 |
| | Peak Mw (kDa) | 171417 | 169182 | 171417 | 169182 | 171417 | 169182 |

Figure 1:
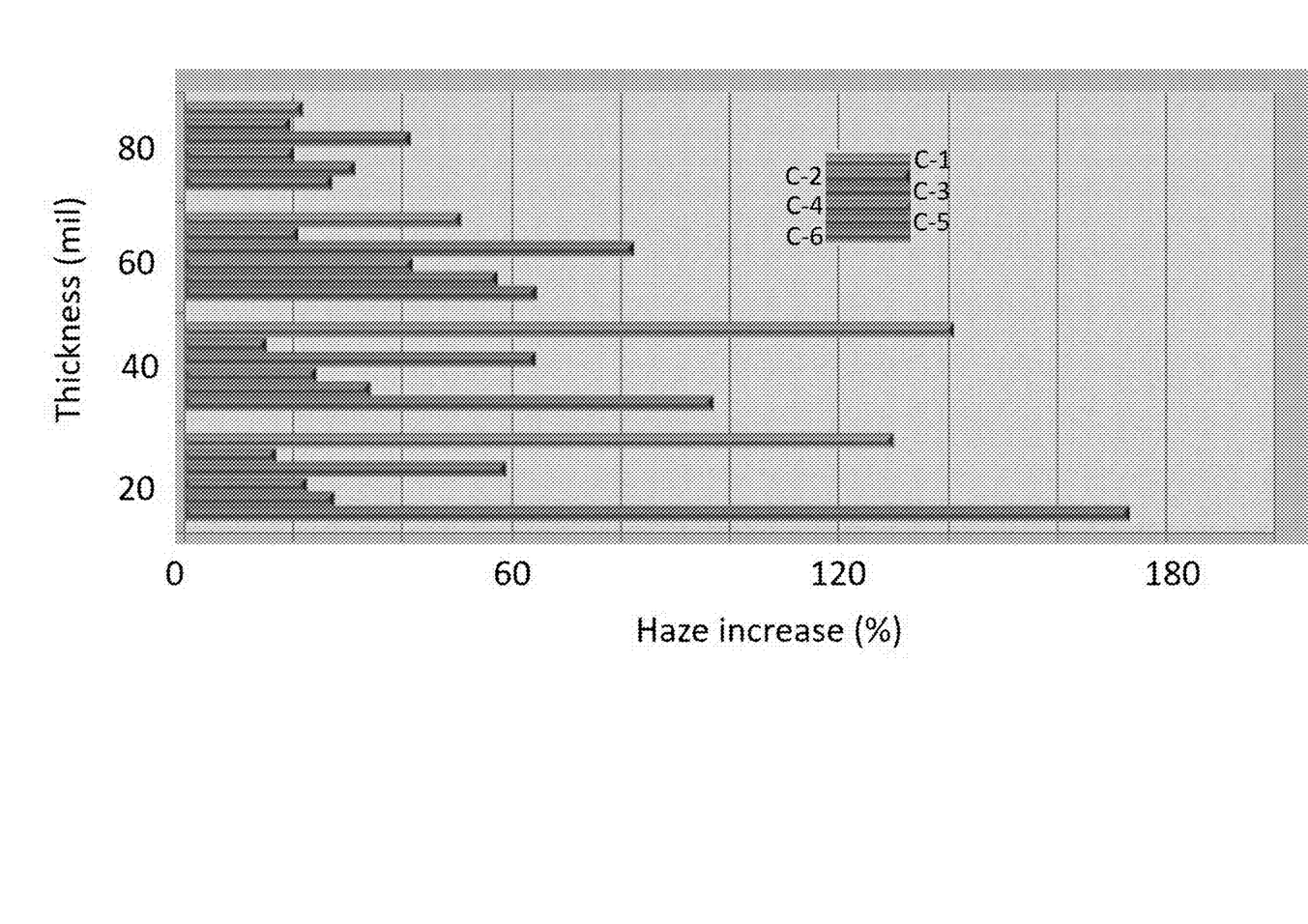
FIG. 1: Percentage haze increase after autoclaving at 130° C. for 30 minutes of plaques containing the compositions C-1 to C-6. While the invention is susceptible to various modifications and alternative forms, specific embodiments thereof are shown by way of example in the drawings. The drawings may not be to scale.

The compositions, C-1 to C-6, have similar stiffness and Izod impact strength. The crystallization temperature (Tc) of the compositions are in line with their nucleating agent/clarifying agent content. Inventive compositions C-4 and C-5, display impressive haze values, while using much lower amount of clarifying agent, 1,3,5-tris (2,2-dimethyl propanamido) benzene and 2,2'-methylenebis (4,6,-di-tert-butylphenyl) phosphate, respectively. The haze values of all samples increased after autoclaving at 130° C. for 30 minutes. Composition C-5 shows the lowest "after/before haze" ratio. FIG. 1 shows percentage haze increase after autoclaving the compositions C-1 to C-6.

Properties of the inventive compositions C-4 and C-5 were studied for multi-pass extrusion. Extrusion conditions used for C-4 and C-5 are provided in Tables 4 and 5 respectively. Properties of compositions C-4 and C-5 after each pass were measured and were compared with those of C-6 (Table 6).

TABLE 4

Multi-pass extrusion parameters for composition C-4

| Temperature | Set Points | Pass 0 | Pass 1 | Pass 2 | Pass 3 | Pass 4 | Pass 5 |
|---|---|---|---|---|---|---|---|
| Zone 1 | 390 | | 386 | 386 | 385 | 392 | 386 |
| Zone 2 | 485 | | 489 | 479 | 489 | 480 | 488 |
| Zone 3 | 545 | | 542 | 540 | 548 | 519 | 549 |
| Die | 545 | | 543 | 545 | 546 | 545 | 532 |
| Melt | 500 | | 506 | 496 | 500 | 500 | 499 |
| Extruder PSI | | 795 | 690 | 654 | 595 | 498 |

TABLE 4-continued

Multi-pass extrusion parameters for composition C-4

| Temperature | Set Points | Pass 0 | Pass 1 | Pass 2 | Pass 3 | Pass 4 | Pass 5 |
|---|---|---|---|---|---|---|---|
| RPM | | | 148.5 | 148.6 | 148.3 | 148.3 | 148.4 |
| AMPS | | | 6.9 | 6.5 | 6.3 | 6.0 | 6.1 |
| Pelletizer Setting | | | 475 | 497 | 497 | 495 | 530 |

TABLE 5

Multi-pass extrusion parameters for composition C-5

| Temperature | Set Points | Pass 0 | Pass 1 | Pass 2 | Pass 3 | Pass 4 | Pass 5 |
|---|---|---|---|---|---|---|---|
| Zone 1 | 390 | 390 | 385 | 385 | 393 | 386 | |
| Zone 2 | 485 | 489 | 490 | 481 | 484 | 480 | |
| Zone 3 | 545 | 549 | 543 | 548 | 545 | 541 | |
| Die | 545 | 543 | 548 | 543 | 543 | 543 | |
| Melt | 500 | 498 | 501 | 500 | 501 | 499 | |
| Extruder PSI | | 788 | 712 | 651 | 583 | 546 | |
| RPM | | 148.4 | 148.3 | 148.2 | 148.2 | 148.2 | |
| AMPS | | 6.9 | 6.5 | 6.4 | 6.1 | 5.9 | |
| Pelletizer Setting | | 480 | 492 | 500 | 500 | 530 | |

TABLE 6

Properties after pass 0, 1, 3, and 5

| | | Samples | | |
|---|---|---|---|---|
| | | C-4 | C-5 | C-6 |
| Haze Plaques, 40 mil (%) | Pass 0 | 14.6 | 20 | 39.3 |
| | Pass 1 | 13.7 | 19.6 | 39.8 |
| | Pass 3 | 13.8 | 22.5 | 41.7 |
| | Pass 5 | 13.9 | 25.8 | 44.4 |
| Melt Flow Rate (g/10 min) | Pass 0 | 4.2 | 4.3 | 4.1 |
| | Pass 1 | 6.8 | 6.8 | 5.6 |
| | Pass 3 | 12.0 | 12.2 | 9.1 |
| | Pass 5 | 18.7 | 18.5 | 13 |
| YI | Pass 0 | −2.66 | −2.12 | −3.41 |
| | Pass 1 | −1.72 | −1.01 | −2.14 |
| | Pass 3 | 0.2 | 0.63 | −1.07 |
| | Pass 5 | 0.99 | 1.87 | 1.38 |

The melt flow rate (MFR) and yellowness Index (YI) of the compositions increased after each pass. For composition C-5 the increase of haze value with the multiple extrusion passes were moderate, but for composition C-4 the haze value remained almost same, at around 15%, even after 5 extrusion passes. Over all the inventive compositions C4 and C5 display excellent low haze values and composition C-4 shows minimum change in haze values with multiple regrinding and extrusion.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymeric composition comprising:
   at least 95 wt. % of a polypropylene copolymer; and
   50 ppm to 2000 ppm of an aryl amide containing clarifying agent, a phosphate ester salt containing clarifying agent, or a combination thereof;
   wherein the polymeric composition has a haze value of A after being extruded once and a haze value of B after being extruded 2 times, wherein the ratio of A to B is 1 to 1.35, wherein A is less than 25%, and wherein A and B are determined in accordance with ASTM D1003, at a thickness of about 40 mil.

2. The polymeric composition of claim 1, wherein the ratio of A to B is 1 to 1.07.

3. The polymeric composition of claim 1, comprising 99 wt. % to 99.95 wt. % of the polypropylene copolymer.

4. The polymeric composition of claim 1, wherein the polypropylene copolymer is ethylene-propylene random copolymer.

5. The polymeric composition of claim 4, wherein the ethylene-propylene random copolymer comprises 0.1 wt. % to 5 wt. % of ethylene units and 95 wt. % to 99.9 wt. % of propylene units, based on the total weight of the copolymer.

6. The polymeric composition of claim 1, wherein the polypropylene copolymer has a melt flow of 1 to 10 g/10 mins at 230° C., 2.16 kg measured in accordance with ASTM D-1238, and density of 0.90 g/cc to 0.93 g/cc as measured in accordance with D 1505.

7. The polymeric composition of claim 1, further comprising at least one additive, wherein the at least one additive is an antioxidant, a stabilizer, a neutralizer, or an antistatic.

8. The polymeric composition of claim 7, wherein the additive is an antioxidant comprising a sterically hindered phenol.

9. The polymeric composition of claim 7, wherein the additive is a stabilizer comprising a phosphite.

10. The polymeric composition of claim 9, wherein the additive is an antistatic comprising an ester.

11. The polymeric composition of claim 10, wherein the additive is a neutralizer comprising a stearate.

12. The polymeric composition of claim 7, comprising 50 ppm to 500 ppm of the antioxidant, 200 ppm to 2000 ppm of the stabilizer, 100 ppm to 1000 ppm of the neutralizer, and 200 ppm to 2000 ppm of the antistatic.

13. The polymeric composition of claim 1, wherein an injection molded plaque comprising the polymeric composition has a yellowness index (YI) of −2 to −2.7, as measured in accordance with ASTM D-6290 at a thickness of 0.5 mm or higher.

14. The polymeric composition of claim 1, wherein the polymeric composition comprises the aryl amide containing clarifying agent.

15. The polymeric composition of claim 14, wherein the aryl amide containing clarifying gent is 1,3,5-tris (2,2-dimethyl propanamido) benzene.

16. The polymeric composition of claim 1, wherein the polymeric composition comprises the phosphate ester salt containing clarifying agent.

17. The polymeric composition of claim 1, wherein the phosphate ester salt containing clarifying agent is 2,2'-methylenebis (4,6,-di-tertbutylphenyl) phosphate sodium or lithium salt.

18. The polymeric composition of claim 1, wherein the composition is comprised in an article of manufacture.

19. The polymeric composition of claim 18, wherein the article of manufacture is transparent.

20. The polymeric composition of claim 18, wherein the article of manufacture is a housewares food storage container, cooking utensil, plate, cup, cavity tray, drinking cup, measuring cup, strainer, turkey baster, non-food storage container, filing cabinet, cabinet drawer, general storage device, organizer, tote, sweater box, rigid packaging, deli container, deli container lid, dairy container, dairy container lid, personal care product bottle and jar, furniture, furniture component, building material and building container components, film, coating, fiber, bag, adhesive, yarn and fabric blister, or clamshell.

21. A method for forming a thermoformed article, the method comprising:
    melt extruding a polymeric composition of claim 1 to form an extruded sheet; and
    thermoforming the extruded sheet within a tool to form the thermoformed article.

22. A method for forming a thermoformed article, the method comprising:
    melt extruding a polymeric composition of claim 1 to form a first extruded sheet;
    thermoforming the first extruded sheet within a tool to form a thermoformed article, wherein the thermoforming of the first extruded sheet creates one or more waste portions of the first extruded sheet; and
    melt extruding the one or more waste portions to form an additional extruded sheet.

* * * * *